(12) United States Patent
Doherty et al.

(10) Patent No.: US 9,109,910 B2
(45) Date of Patent: Aug. 18, 2015

(54) METHOD AND DECREASING POSITION ERROR DURING TURN-BY-TURN SESSIONS

(75) Inventors: James Doherty, Wyandotte, MI (US); Shpetim S. Veliu, Livonia, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 680 days.

(21) Appl. No.: 13/172,347

(22) Filed: Jun. 29, 2011

(65) Prior Publication Data
US 2013/0006519 A1  Jan. 3, 2013

(51) Int. Cl.
*G01C 21/00* (2006.01)
*G01C 21/34* (2006.01)
*G01S 19/40* (2010.01)
*G01S 19/49* (2010.01)

(52) U.S. Cl.
CPC .................. *G01C 21/34* (2013.01); *G01S 19/40* (2013.01); *G01S 19/49* (2013.01)

(58) Field of Classification Search
CPC ......... G01S 19/05; G01S 19/06; G01S 19/20; G01S 19/45; G01S 19/46; G01S 19/47; G01S 19/48; G01S 19/49; G01S 5/0263; G01C 21/12; G01C 21/14; G01C 21/16; G01C 21/165
USPC .......................................... 701/201, 416, 469
See application file for complete search history.

(56) References Cited

U.S. PATENT DOCUMENTS

2004/0220733 A1* 11/2004 Pasturel et al. ............... 701/214
2007/0216540 A1*  9/2007 Riley et al. .................... 340/903

* cited by examiner

*Primary Examiner* — John Q Nguyen
*Assistant Examiner* — Kyung Kim
(74) *Attorney, Agent, or Firm* — Leydig, Voit & Mayer, Ltd.

(57) ABSTRACT

The described method and system provide for GPS navigation utilizing an EHPE (estimated horizontal positioning error) timer for reducing route calculation failures. By utilizing an EHPE timer, a GPS unit may continue to check for GPS signal until the EHPE timer expires before reporting route calculation failure to the user. Thus, in situations where GPS signal is only temporarily lost and current location information is only temporarily degraded, user route requests will not necessarily result in route calculation failure. In preferred implementations, the system and method are implemented within the context of a telematics unit in a vehicle or in the context of a call center.

6 Claims, 4 Drawing Sheets

METHOD AND DECREASING POSITION ERROR DURING TURN-BY-TURN SESSIONS

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

One of the services conventionally provided by TSPs is GPS (global positioning system) navigation, which may include the provision of Turn-by-Turn (TBT) directions. To use GPS navigation, a user of the telematics unit may enter a destination, and the GPS component of the telematics unit may provide directions (e.g. through a display and/or through vocal instructions) to the user based on a calculated course from the user's current location to the user's destination. When a user does not follow the directions and goes off-course (i.e., when the position of the vehicle is not on the calculated course), the GPS unit may recalculate a new course for the user to take based on the vehicle's position when it goes off-course.

When a user requests GPS position information or calculation of a route or TBT directions where GPS signals are not available (e.g. in a tunnel or parking garage or other problem areas), the GPS system may be unable to determine the user's current position and thus be unable to calculate a route for the user. This is often an annoyance or inconvenience to the user, and thus, it is an object in part to provide an improved system and method for GPS navigation to address this problem. However, while this is an object underlying certain implementations of the invention, it will be appreciated that the invention is not limited to systems that solve the problems noted herein. Moreover, the inventors have created the above body of information merely for the convenience of the reader; the foregoing is a discussion of problems discovered and/or appreciated by the inventors, and is not an attempt to review or catalog the prior art.

BRIEF SUMMARY OF THE INVENTION

The invention provides a system and method for GPS navigation utilizing an EHPE (estimated horizontal positioning error) timer for reducing route calculation failures. In one implementation, the method comprises: receiving, at a route calculation unit, input from a user corresponding to a route calculation request; determining whether an EHPE (estimated horizontal positioning error) value corresponding to a first calculated current location associated with the vehicle is acceptable; and if the EHPE value corresponding to the first calculated current location associated with the vehicle is not acceptable: initiating an EHPE counter with a predetermined expiration; determining whether an EHPE value corresponding to another calculated current location associated with the vehicle is acceptable before the EHPE counter reaches the predetermined expiration; and if the EHPE is not determined to be acceptable before the EHPE counter expires, notifying the user that route calculation has failed after the EHPE counter has expired. If the EHPE value corresponding to any calculated current location associated with the vehicle is determined to be acceptable, performing route calculation according to the route calculation request.

An EHPE value is acceptable if it does not exceed a predetermined threshold, and the EHPE value is not acceptable if it exceeds the predetermined threshold. The EHPE counter may preferably be an EHPE timer and the predetermined expiration may preferably be in units of time. Furthermore, the determination of whether an EHPE value corresponding to another calculated current location associated with the vehicle is acceptable may be performed periodically before the EHPE counter reaches the predetermined expiration.

The inventive principles described herein may be implemented as computer executable instructions on a tangible, non-transient computer-readable medium in a GPS system. In preferred implementations, the system and method are implemented within the context of a GPS unit that is part of a telematics unit in a vehicle or within the context of a TSP call center. In a further implementation, a call from the telematics unit to the call center may be initiated if the EHPE counter expires due to a route calculation failure.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for GPS navigation utilizing an EHPE timer for reducing route calculation failures. In preferred implementations, the GPS navigation may be performed by a GPS unit that is part of a telematics system on a vehicle.

Figure 1:
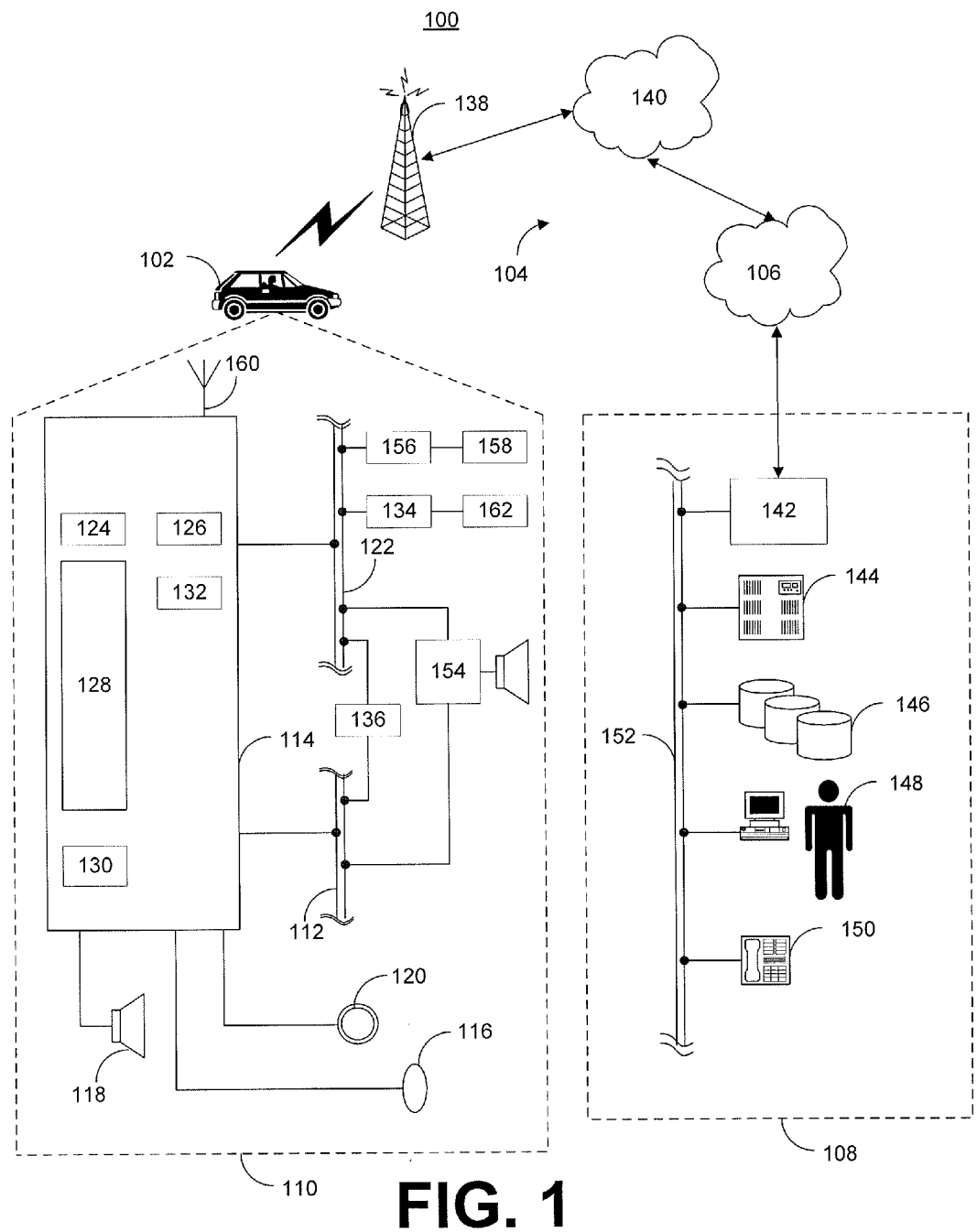
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

GPS navigation services may be implemented based on the geographic position information of the vehicle provided by the GPS based chipset/component 132. A user of the telematics unit may enter a destination using inputs corresponding to the GPS component, and a route to a destination may be calculated based on the destination address and an inputted starting address, or a current position of the vehicle determined at approximately the time of route calculation, or, according to implementations of the present invention, based on a previously known position of the vehicle.

Turn-by-turn (TBT) directions may further be provided on a display screen corresponding to the GPS component and/or through vocal directions provided through a vehicle audio component 154. It will be appreciated that the calculation-related processing may occur at the telematics unit or may occur at a call center 108. It will be appreciated that TBT directions is merely a type of GPS navigation, and because the principles described herein are applicable to GPS navigation, they are equally applicable to GPS navigation through TBT directions. It will also be appreciated that the processing associated with GPS navigation/TBT directions may be carried out at a vehicle through a telematics unit, at a TSP call center, or both (e.g. the intelligence for route calculation may be implemented locally at the GPS unit of the vehicle, or may be implemented at the call center and provided wirelessly to the vehicle).

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission.

In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
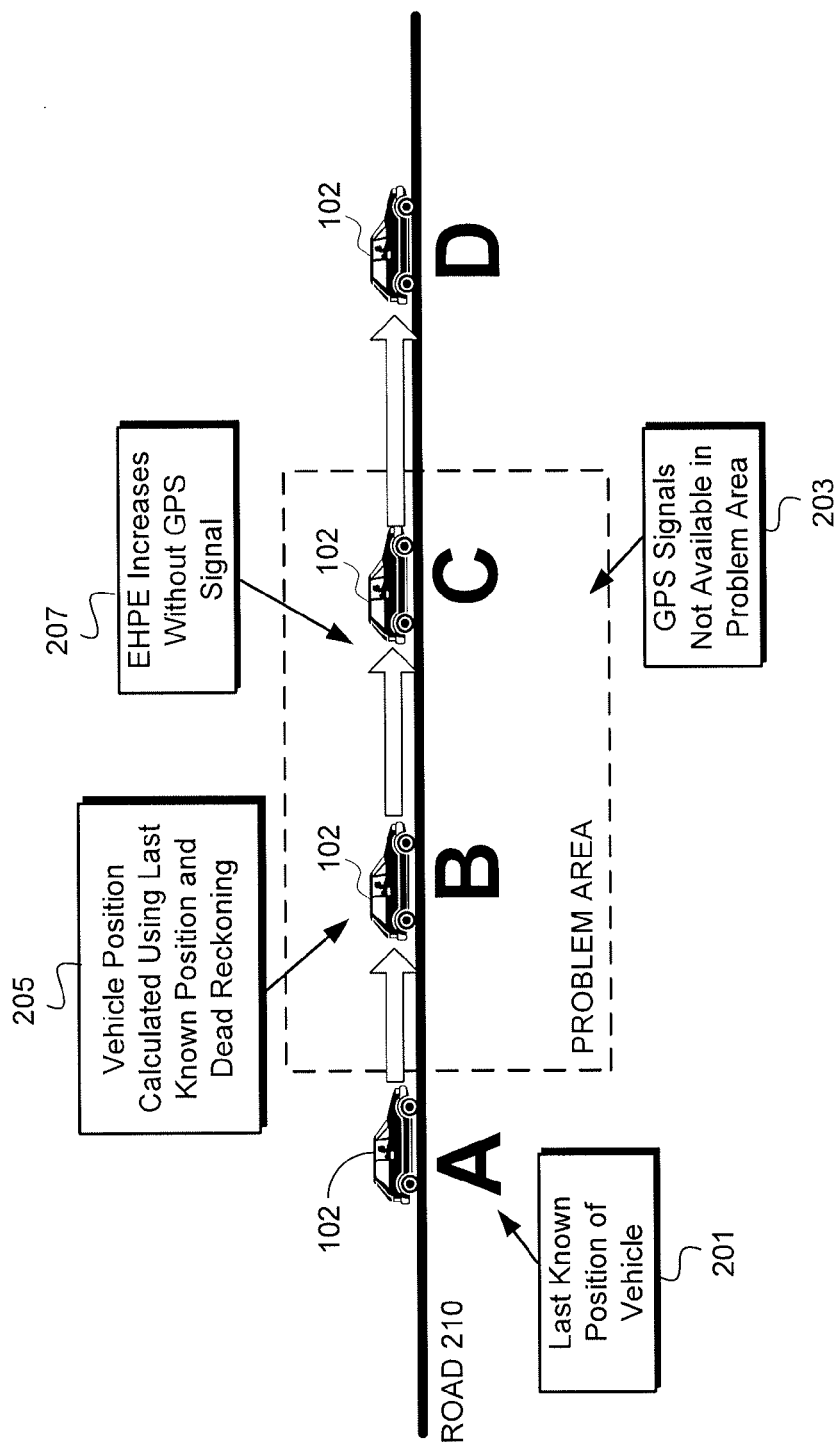
FIG. 2 is a diagram illustrating an example of GPS navigation using a combination of GPS signals and dead reckoning in accordance with an implementation of the described principles.

With further reference to the architecture of FIG. 1, and turning more specifically to FIG. 2, a diagram 200 of a vehicle 102 traveling on a road 210 is depicted to illustrate GPS navigation using a combination of GPS signals and dead reckoning. It will be appreciated that conventional GPS systems utilize both GPS position information and dead reckoning (i.e. estimation of current position based on speed, time and direction) to determine a user's current location. In the example depicted by FIG. 2, a vehicle 102 travels from position A, outside of a problem area (i.e. an area where GPS signals are not available 203) to position B, which is inside the problem area. It will be appreciated that the problem area may be any area where GPS reception is impaired, including but not limited to parking garages, tunnels, and urban canyons. Thus, the vehicle's last known position 201 where GPS signals were available is at position A, and while the vehicle is traveling through the problem area (i.e. at positions B and C), the vehicle position may be calculated based on the last known position and dead reckoning 205. However, the longer the vehicle remains within the problem area, the more the EHPE value increases 207, as calculation of current position based on dead reckoning alone (in combination with a last known position) is not as accurate as calculating current position based on dead reckoning with up-to-date GPS information. Thus, the estimated error associated with the current position of the vehicle increases with an increase in the distance of the vehicle traveled from the last known position of the vehicle 201.

When the EHPE value exceeds a predetermined threshold, route calculation may no longer be available to vehicle 102, as the telematics unit of the vehicle 102 or a call center responsible for off-board navigation (OBN) for the vehicle 102 may determine that the EHPE associated with the current position of the vehicle is too large to allow the provision of a route for GPS navigation or TBT directions. It will be appreciated that the route calculation intelligence may be implemented at the vehicle telematics unit or at a call center, and that the predetermined threshold for EHPE may be programmed into the telematics unit or at a call center, based on how the system is implemented.

When a user requests a route and the EHPE exceeds the threshold, an error notification may be presented to the user indicating to the user that route calculation is not available. The notification may further set up a call to the call center or direct the user to call the call center if GPS navigation is required. However, this may not always be desirable, as the user may momentarily leave the problem area and arrive at point D in FIG. 2, where GPS signals are available.

Figure 3:
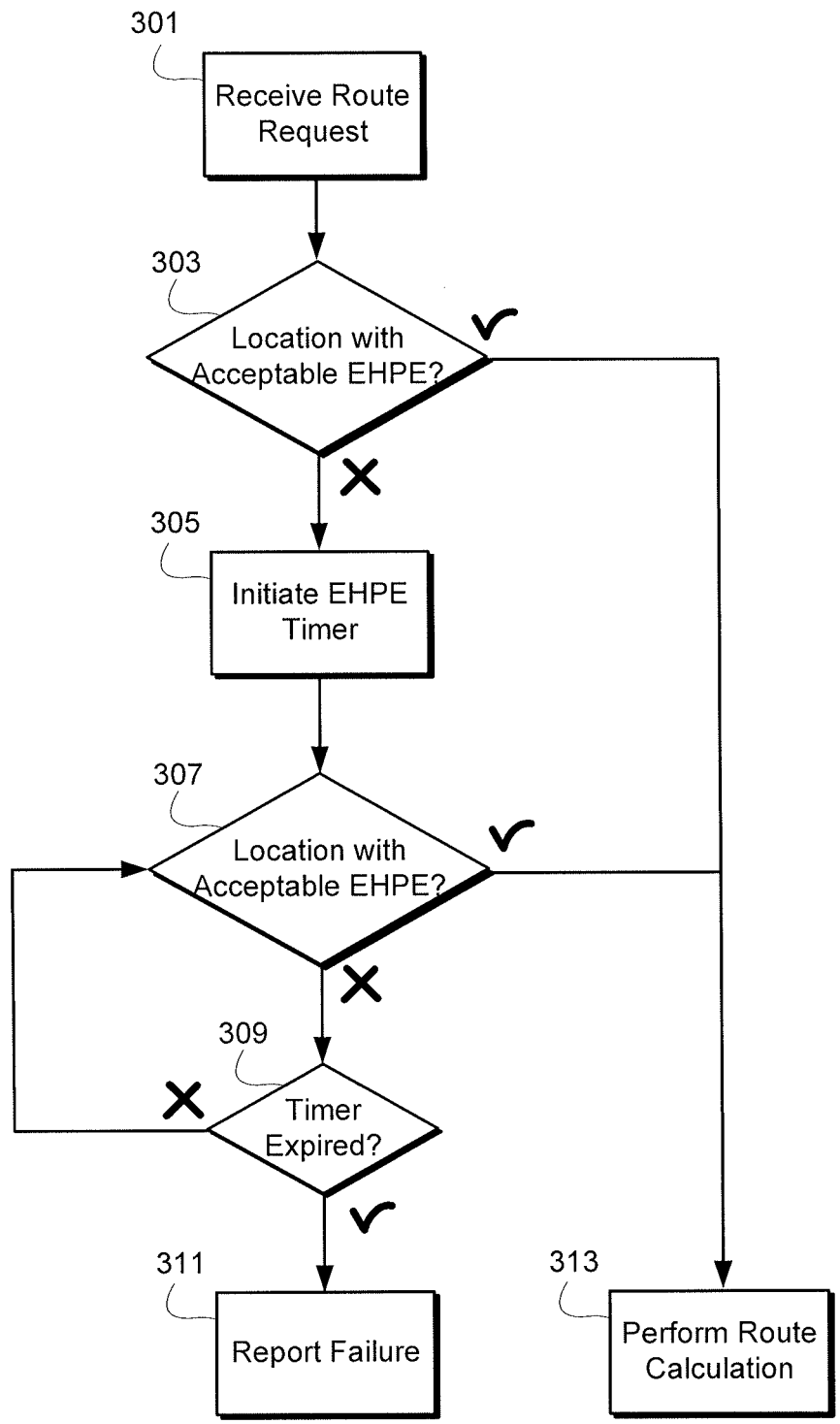
FIG. 3 is a flowchart illustrating a process for utilizing an EHPE timer for reducing route calculation failures in accordance with an implementation of the described principles.

Therefore, a process 300 depicted by FIG. 3 according to an implementation of the present invention is provided to avoid such unnecessary route calculation failures. As shown in FIG. 3, a route calculation unit (e.g. at the telematics unit or a route calculation unit at the call center) first receives a route request from a user 301. If the current position of the user is available with an acceptable EHPE value (i.e. the EHPE does not exceed the predetermined threshold) 303, the route calculation may be performed and route information and directions may be communicated to the user 313. If the current position of the user does not have an acceptable EHPE value (i.e. the EHPE exceeds the predetermined threshold) 303, an EHPE timer is initiated 305. After the timer is initiated, the route calculation unit may continue to check whether the current position of the user is available with an acceptable EHPE value 307. This check may be performed periodically based on the amount of time elapsed or based on distance traveled, or based on some other trigger. So long as the timer does not expire (i.e. reach a predetermined amount of elapsed time) 309, the route calculation unit may continue performing the check 307. If, during a check, it determines that the current location information of the vehicle has an acceptable EHPE value 307, it may perform route calculation 313 and provide GPS navigation according to that route. If the timer expires without ever passing a check 309, the route calculation may report the failure to the user. In a further implementation, a call to the call center may be initiated upon failure to facilitate the provision of directions to a user by a call center operator.

It will be appreciated that the EHPE timer is not required to count in units of time. For example, the EHPE timer may more generally be an EHPE counter that has a predetermined expiration based on a predetermined number of EHPE value checks or a predetermined distance traveled. It will further be appreciated that this timer may be implemented at the telematics unit or at the call center. If implemented at the call center, the telematics unit may transmit all necessary information to the call center (i.e. location information of the vehicle, EHPE value or parameters necessary to calculate EHPE value, etc.) in order for the call center to determine whether a vehicle location with an acceptable EHPE value may be determined.

Figure 4:
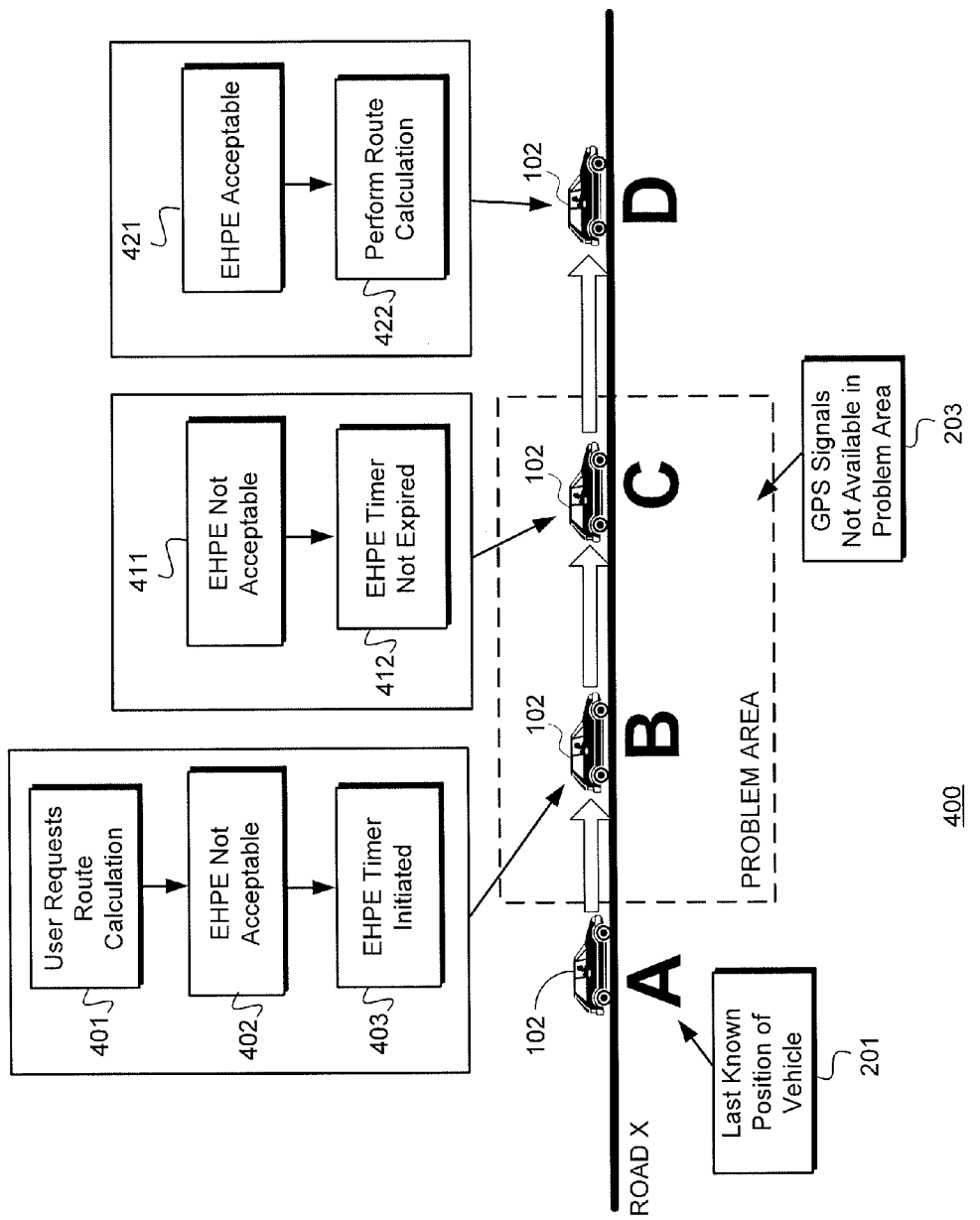
FIG. 4 is a diagram illustrating an example of GPS navigation using an EHPE timer for reducing route calculation failures in accordance with an implementation of the described principles.

The diagram 400 of FIG. 4 depicts an example of the process described by FIG. 3. In this example, at point B, when the vehicle 102 is inside the problem area, the user requests a route calculation 401, the telematics unit or call center determines that the EHPE value associated with the vehicle location is not acceptable 402, and an EHPE timer is initiated 403. At point C, the route calculation unit at the telematics unit or call center checks whether the current location information associated with the vehicle has an acceptable EHPE, determines that it is not acceptable 411, and also determines that the EHPE timer has not expired. Thus, the route calculation unit checks again at point D, and because the vehicle 102 has left the problem area and GPS signals are available, the current location information associated with the vehicle now has an acceptable EHPE. The route calculation unit determines that the EHPE value is acceptable 421, calculates a route 422, and communicates the route information and directions to the user.

It will be appreciated by those of skill in the art that the execution of the various machine-implemented processes and steps described herein may occur via the computerized execution of computer-executable instructions stored on a tangible, non-transient computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center. It will further be appreciated that, although the above implementations have been described in the context of a telematics unit and vehicles, the principles described herein are not limited to telematics units or vehicles and may also be implemented on standalone GPS devices and other types of GPS navigation units (such as those provided on mobile phones).

It will thus be appreciated that the described system and method allows for GPS navigation utilizing an EHPE timer for reducing route calculation failures. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for satellite-based navigation, comprising:
receiving, by a device, satellite-based positioning information corresponding to a location of a vehicle;
determining, by the device, that satellite-based positioning signal reception is impaired, using the received location of the vehicle as the vehicle's last known position, and determining a current location of the vehicle based on the vehicle's last known position and dead reckoning navigation since the vehicle was at the vehicle's last known position;
determining and updating, by the device, a value of an error parameter based on the use of the dead reckoning navigation;
receiving, by the device, a route calculation request;
comparing, by the device, in response to the route calculation request, a current updated value of the error parameter and a threshold value, and determining that the current updated value exceeds the threshold value;
initiating, by the device, in response to determining that the current updated value exceeds the threshold value, an error timer having an expiration;
determining, by the device, that the error timer has reached the expiration, wherein the device does not provide route calculation failure notifications and does not provide route calculation during the time period after the error timer is initiated and before the error timer reached the expiration; and
providing, by the device, in response to determining that the error timer has reached the expiration, a route calculation failure notification;
wherein the updating the value of the error parameter includes updating the value of the error parameter during the time period after the error timer is initiated and before the error timer reached the expiration, wherein updated values of the error parameter during the time period after the error timer is initiated and before the error timer reached the expiration exceed the threshold value.

2. The method of claim 1, wherein the vehicle is a telematics-equipped vehicle and the device is, is part of, or is connected to a telematics unit of the vehicle.

3. The method of claim 1, wherein the device is part of a call center in communication with the vehicle.

4. A non-transitory computer-readable medium having processor-executable instructions stored thereon for satellite-based navigation, the processor-executable instructions, when executed by a processor, facilitating performance of a method comprising the following steps:

receiving satellite-based positioning information corresponding to a location of a vehicle;

determining that satellite-based positioning signal reception is impaired, using the received location of the vehicle as the vehicle's last known position, and determining a current location of the vehicle based on the vehicle's last known position and dead reckoning navigation since the vehicle was at the vehicle's last known position;

determining and updating a value of an error parameter based on the use of the dead reckoning navigation;

receiving a route calculation request;

comparing, in response to the route calculation request, a current updated value of the error parameter and a threshold value, and determining that the current updated value exceeds the threshold value;

initiating, in response to determining that the current updated value exceeds the threshold value, an error timer having an expiration;

determining that the error timer has reached the expiration, wherein route calculation failure notifications and route calculation are not provided during the time period after the error timer is initiated and before the error timer reached the expiration; and providing, by the device, in response to determining that the error timer has reached the expiration, a route calculation failure notification;

wherein the updating the value of the error parameter includes updating the value of the error parameter during the time period after the error timer is initiated and before the error timer reached the expiration, wherein updated values of the error parameter during the time period after the error timer is initiated and before the error timer reached the expiration exceed the threshold value.

5. The non-transitory computer-readable medium of claim 4, wherein the vehicle is a telematics-equipped vehicle and the non-transitory computer-readable medium is part of or is connected to a telematics unit of the vehicle.

6. The non-transitory computer-readable medium of claim 4, wherein the non-transitory computer-readable medium is part of a call center in communication with the vehicle.

* * * * *